UNITED STATES PATENT OFFICE.

HILYARD STOKES, OF BEVERLY, NEW JERSEY, ASSIGNOR TO FRANKLIN S. HOVEY, OF SAME PLACE.

COMPOSITION FOR PRESERVING WOOD.

SPECIFICATION forming part of Letters Patent No. 403,449, dated May 14, 1889.

Application filed February 9, 1889. Serial No. 299,329. (No specimens.)

*To all whom it may concern:*

Be it known that I, HILYARD STOKES, a citizen of the United States, residing at Beverly, in the county of Burlington and State of New Jersey, have invented certain new and useful Improvements in Compositions for Preserving Wood; and I do hereby declare the following to be a full, clear, and exact description of the invention, such as will enable others skilled in the art to which it appertains to make and use the same.

My invention relates to a novel composition of matter more particularly to be used as a wood-filler for the preservation of wood, though it may be used upon wood for the purpose of destroying insect life, or as a substitute for an important ingredient in the manufacture of paints, or as a primer before the application of paint to wood.

In making my composition I use the following ingredients, mixed or combined in substantially the following proportions, viz: Ten pints of crude petroleum-oil, three pints of rosin-oil, one pint of oil of tar, and one pint of fine salt.

In mixing the ingredients together the fine salt is first thoroughly dissolved in any convenient suitable vehicle, and is then poured into the mixing pail, tub, or barrel, as desired, or it may be first dissolved in the general mixing-reservoir, and then the other ingredients poured in upon and thoroughly mixed with it by stirring or otherwise agitating the whole body, after which the composition is ready for immediate use; or it will remain in the same condition for any length of time ready for use or to be shipped at convenience.

In indicating the proportions of the various ingredients above which I prefer to use, I do not wish to be limited to the exact proportions, as they may be more or less varied without departing from the essential features of my invention.

The first three ingredients named—the petroleum-oil, the rosin-oil, and the oil of tar—form the body of the composition, and the salt is added to keep the mixture pliable, and when applied to the wood to prevent that portion remaining on the surface from checking or cracking, as well as on account of its penetrating properties, which it imparts to the whole composition, enabling it to much more readily and perfectly fill the pores and fibers of the wood.

The nature of the composition is such as to fill the fibers and furnish a complete coating for the surface of the wood and prevent the admission of moisture. It is adapted for use on all wood desired to be preserved above or below the ground, and may be applied by a brush or by dipping the article into the composition, as the circumstances may require.

It is well known that the young timber ordinarily selected for fence and gate posts and for telegraph-poles, having one end inserted in the ground, soon decays, causing great expense in replacing them, aside from the danger to human life attending the unexpected fall of the poles, owing to the rapid decomposition of their grounded ends. By dipping or immersing or brushing over the ground ends of this class of posts with my improved composition before their insertion into the ground, thereby preventing all moisture from entering the grounded portion of the post, they are preserved from three to four times longer than without the application. I do not, however, confine myself in the use of my composition to articles within or below the surface of the ground, as it may be used with equal advantage for preserving wood exposed to the atmosphere and dampness on account of near contact with the earth—as railroad-ties and the lower joists and sills of buildings, which when thoroughly coated with the composition are found to last much longer in a thoroughly preserved state than without it.

The composition is useful, also, when applied to the surface of unpainted wood on the interior of buildings as a destroyer of insect life, and for this purpose it is used in kitchens, pantries, bedsteads, and in outhouses in which fowls are kept. It is applied, also, as a priming material for the first coat in filling the wood pores of new buildings before the regular paint is put on, and also as a waterproof coating for house-walls made of porous or spongy brick that admit of dampness when subjected to driving rain-storms. In this application the composition is taken up by the bricks when rubbed or brushed upon the wall, filling the pores and leaving a coating upon the surface, rendering the wall impervious to the percolation of dampness or water through them.

My new water-proof material is also applied to porous or soft wood that is to be constantly immersed in water, as upon the bottom of boats, dock-planks, and buoys, and hardens and prevents the wood, as in its natural state, from becoming filled and saturated with water, and consequently softened and much more rapidly worn away.

In the manufacture of paint, my improved composition is substituted for linseed or nut oil at a great saving to the manufacturer, and provides an article of paint that will not crack, blister, or peel off when subjected to the test of the warmest climates.

I am aware that dead-oil or petroleum-oil, sulphur, resin, and carbolic acid have been united and applied for preventing the decay of wood; but I believe myself to be the first to find that the ingredients named and combined in substantially the proportions and under the conditions stated provide an effective composition for the purpose set forth.

Having fully described my invention, what I claim as new, and desire to secure by Letters Patent of the United States, is—

The herein-described composition of matter for preserving wood and rendering other materials water-proof, consisting of crude petroleum-oil, rosin-oil, oil of tar, and fine salt, combined in substantially the proportions set forth.

In testimony whereof I affix my signature in presence of two witnesses.

HILYARD STOKES.

Witnesses:
 J. W. ROBERTS,
 J. ELIZABETH H. ALLEN.